US012351928B2

(12) United States Patent
Lee et al.

(10) Patent No.: US 12,351,928 B2
(45) Date of Patent: Jul. 8, 2025

(54) ELECTRODEPOSITION APPARATUS TO PREPARE A MULTILAYER COPPER FOIL

(71) Applicant: DONG-A UNIVERSITY RESEARCH FOUNDATION FOR INDUSTRY-ACADEMY COOPERATION, Busan (KR)

(72) Inventors: Hyo Jong Lee, Busan (KR); Han Kyun Shin, Changwon-si (KR); Sang Hyeok Kim, Busan (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 266 days.

(21) Appl. No.: 17/975,185

(22) Filed: Oct. 27, 2022

(65) Prior Publication Data

US 2023/0047101 A1    Feb. 16, 2023

Related U.S. Application Data

(63) Continuation of application No. PCT/KR2021/002172, filed on Feb. 22, 2021.

(30) Foreign Application Priority Data

May 7, 2020   (KR) .................. 10-2020-0054191

(51) Int. Cl.
C25D 1/04    (2006.01)
C25D 3/38    (2006.01)
C25D 5/10    (2006.01)
C25D 21/12   (2006.01)

(52) U.S. Cl.
CPC .............. *C25D 1/04* (2013.01); *C25D 3/38* (2013.01); *C25D 5/10* (2013.01); *C25D 21/12* (2013.01)

(58) Field of Classification Search
CPC ...................................................... C25D 1/04
See application file for complete search history.

(56) References Cited

U.S. PATENT DOCUMENTS

2005/0029106 A1* 2/2005 Baniahmad ............ C25D 21/12
                                                257/E21.175

FOREIGN PATENT DOCUMENTS

| JP | 2014-125679 A  | 7/2014  |
| JP | 2016-113645 A  | 6/2016  |
| KR | 10-1997-0015792 A | 4/1997 |
| KR | 10-0571561 B1  | 4/2006  |
| KR | 10-2006-0114588 A | 11/2006 |

(Continued)

OTHER PUBLICATIONS

Lou et al., Electroplating, Encyclopedia of Chem. Proc. (Year: 2006).*

(Continued)

*Primary Examiner* — Hosung Chung
(74) *Attorney, Agent, or Firm* — NSIP Law

(57) ABSTRACT

The multilayer copper foil includes: a recrystallization active layer disposed on a surface of a substrate; and a recrystallization suppressing layer disposed on a surface of the recrystallization active layer to inhibit recrystallization of the recrystallization active layer, wherein a concentration of impurities within the recrystallization suppressing layer is greater than a concentration of impurities within the recrystallization active layer.

4 Claims, 7 Drawing Sheets

(56) References Cited

FOREIGN PATENT DOCUMENTS

| KR | 10-2013-0077240 A | 7/2013 |
| KR | 10-2014-0081890 A | 7/2014 |
| KR | 10-2020-0010033 A | 1/2020 |

OTHER PUBLICATIONS

Jeong, Yong-Ho, Chae-Min Park, and Hyo-Jong Lee. "Retardation of Grain Growth of Copper Electrodeposits by Organic Additive." *Proceedings of the Korean Institute of Surface Engineering Conference*. The Korean Institute of Surface Engineering, 2016.

International Search Report issued on Jun. 15, 2021, in counterpart of PCT application No. PCT/KR2021/002172 (4 pages in Korean, 3 pages in English).

Written Opinion issued on Jun. 15, 2021, in counterpart of PCT application No. PCT/KR2021/002172 (4 pages in Korean).

\* cited by examiner

ELECTRODEPOSITION APPARATUS TO PREPARE A MULTILAYER COPPER FOIL

CROSS-REFERENCE TO RELATED APPLICATIONS

Pursuant to 35 USC 120 and 365(c), this application is a continuation of International Application No. PCT/KR2021/002172 filed on Feb. 22, 2021, and claims the benefit under 35 USC 119(a) of Korean Application No. 10-2020-0054191 filed on May 7, 2020, in the Korean Intellectual Property Office, the entire disclosures of which are incorporated herein by reference for all purposes.

BACKGROUND

1. Field

The present invention relates to a multilayer copper foil, a method for manufacturing the same, and an electroplating apparatus to prepare the multilayer copper foil. More particularly, the present disclosure relates to a multilayer copper foil capable of being manufactured into a thin film having grain sizes under controlled by alternately stacking two layers each having a different recrystallization rate, to a method for manufacturing the same, and to an electroplating apparatus to prepare the multilayer copper foil.

2. Description of the Background

Copper foils are mainly divided into rolled copper foils and electrodeposited copper foils. Electrodeposited copper foils are metal copper foils manufactured by electroplating substrates using plating solutions. The electrodeposited copper foils have been widely used for manufacturing of electronic circuit wirings such as PCB or flexible substrates of flexible Cu cladded layer (FCCL). Recently, the electrodeposited copper foils have been used for connection of negative electrode current collector for secondary batteries. In addition, much thinner electrodeposited copper foils than the existing electrodeposited copper foils have been required to improve degree of integration of the secondary battery.

As a result, thin copper foils are preferred in most processes where copper foils are used. However, as thickness of the thin electrodeposited copper foil decreases, its mechanical strength is weakened, thereby deteriorating the stability. Hence, a technique of manufacturing thin copper foils having high strength is required for improvement of the stability of the electrodeposited copper foils.

Various techniques related to the manufacturing of high-strength copper foils exist. However, what causes the increase in the strength of copper foils seems to be somewhat unclear.

Hence, the inventors of the present disclosure accurately understood the factors affecting the increase in strength of metal foils through microstructural analysis of metal foils including copper foils, and analyzed the analysis result to develop the technique of manufacturing a high-strength multilayer metal foil.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a multilayer copper foil includes: a recrystallization active layer disposed on a surface of a substrate; and a recrystallization suppressing layer disposed on a surface of the recrystallization active layer to inhibit recrystallization of the recrystallization active layer, wherein a concentration of impurities within the recrystallization suppressing layer is greater than a concentration of impurities within the recrystallization active layer.

The recrystallization active layer may be formed through electroplating that is performed in a manner that a first external power having a current density value calculatable from a first reaction surface area between the substrate and a plating solution being equal to a predetermined first current density value, is applied to cause electrical conduction in the plating solution, and the substrate is immersed in the plating solution, and the recrystallization suppressing layer may be formed through electroplating that is performed in a manner that a second external power having a current density value calculatable from a second reaction surface area between the substrate and the plating solution being equal to a predetermined second current density value, which is lower than the first current density value, is applied to cause electrical conduction in the plating solution, and the substrate, on which the recrystallization active layer is disposed, is immersed in the plating solution.

The first current density value may be in a range of 1 asd to 5 asd, and the second current density value may be in a range of 0.1 asd to 0.5 asd.

At least two layers of the recrystallization active layer and the recrystallization suppressing layer may be alternately stacked to form a lamellar structure.

The recrystallization active layer may have a thickness in a range of 0.5 μm to 5 μm, and the recrystallization suppressing layer may have a thickness in a range of 0.01 μm to 0.5 μm.

The impurities may be selected from the group consisting of NaCl, HCl, water, sulfuric acid, an organic additive, and JGB (Janus Green B).

In another general aspect, a method for manufacturing a multilayer copper foil includes: preparing a plating solution including copper ions; forming an electroplated multilayer copper foil including a recrystallization active layer and a recrystallization suppressing layer on a surface of a substrate after immersing the substrate in the plating solution; and removing the multilayer copper foil from the substrate and thermally treating the multilayer copper foil.

The forming of the electroplated multilayer copper foil may include: forming the recrystallization active layer through electroplating by supplying a first current having a first current density value calculatable from a first reaction surface area between the substrate and the plating solution being equal to a predetermined first current density value, to the plating solution while the substrate is immersed in the plating solution; and forming the recrystallization suppressing layer through electroplating on a surface of the substrate, on which the recrystallization active layer is formed, by supplying a second current having a second current density value calculatable from a second reaction surface area between the substrate and the plating solution being equal to a predetermined second current density value, which is lower than the first current density value, to the plating solution while the substrate is immersed in the plating solution.

The recrystallization active layer may have a thickness in a range of 0.5 µm to 5 µm, and the recrystallization suppressing layer may have a thickness in a range of 0.01 µm to 0.5 µm.

A plurality of the recrystallization active layer and a plurality of the recrystallization suppressing layer may be alternately stacked by alternately performing the forming of the recrystallization active layer and the forming of the recrystallization suppressing layer repeatedly.

The first current density value may be in a range of 1 asd to 5 asd, and the second current density value may be in a range of 0.1 asd to 0.5 asd.

The plating solution may be prepared by mixing at least one selected from the group consisting of NaCl and HCl, water, sulfuric acid, copper sulfate, an organic additive, and JGB, such that the plating solution includes at least one selected from the group consisting of chlorine ions, the sulfuric acid, copper ions, the JGB, and the organic additive.

The organic additive may include at least one selected from the group consisting of polyethylene glycol and polypropylene glycol, and at least one selected from the group consisting of bis-(3-sulfopropyl)disulfide and 3-mercapto-1-propane sulfonic acid.

In still another general aspect, an electroplating apparatus includes: a plating bath filled with a plating solution comprising copper ions; a substrate having a lower portion positioned in a first side of an internal space of the plating bath; a positive electrode having a lower portion positioned in a second side of the internal space of the plating bath; and a current supply unit connected to an upper portion of the substrate and an upper portion of the positive electrode to supply current such that a current flows through the plating solution when an electric power is applied, wherein the current is supplied such that a first current or a second current is selectively supplied, the first current having a first current density value calculatable from a first reaction surface area between the substrate and the plating solution, the second current having a second current density value calculatable from a second reaction surface area between the substrate and the plating solution and being lower than the first current density value.

The electroplating apparatus may further include a first relay unit electrically connecting the substrate with the current supply unit such that one of the first current and the second current is supplied to the substrate according to a first control signal that is externally input.

The electroplating apparatus may further include a control signal generating unit configured to input the first control signal to the first relay unit.

The control signal generating unit may input the first control signal to the first relay unit such that the first current is supplied to the plating solution and may disenable the first control signal input to the first relay unit such that the second current is supplied to the plating solution when a predetermined time has elapsed, thereby enabling the recrystallization active layer and the recrystallization suppressing layer to be alternately stacked on the surface of the substrate.

The electroplating apparatus may further include a second relay unit electrically connecting the positive electrode with the current supply unit to interrupt the first current and the second current supplied from the current supply unit according to a second control signal input from the control signal generating unit.

The control signal generating unit may input the first control signal to the first relay unit such that the first current is supplied to the plating solution and thus the recrystallization active layer is formed on the surface of the substrate, may input the second control signal to the second relay unit when a predetermined time has elapsed such that a resting period follows, and may disenable the second control signal input to the second relay unit and may disenable the first control signal input to the first relay unit such that the second current is supplied to the plating solution and thus the recrystallization suppressing layer is formed on a surface of the recrystallization active layer.

The first current density value may be in a range of 1 asd to 5 asd, and the second current density value is in a range of 0.1 asd to 0.5 asd.

Other features and aspects will be apparent from the following detailed description and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
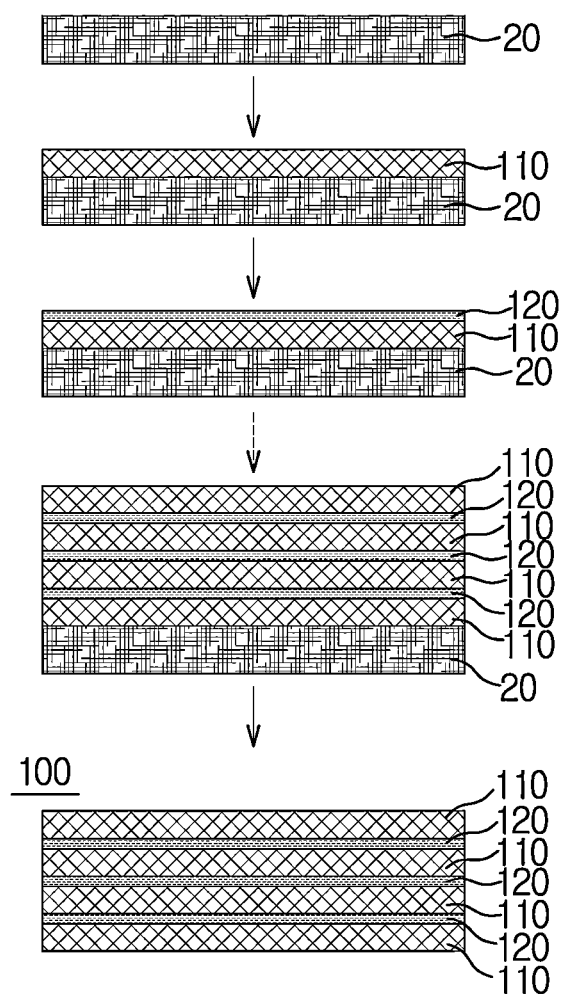
FIG. 1 is a process diagram illustrating the multilayer copper foil and the manufacturing process of the multilayer copper foil according to an embodiment of the present disclosure.
Figure 2:
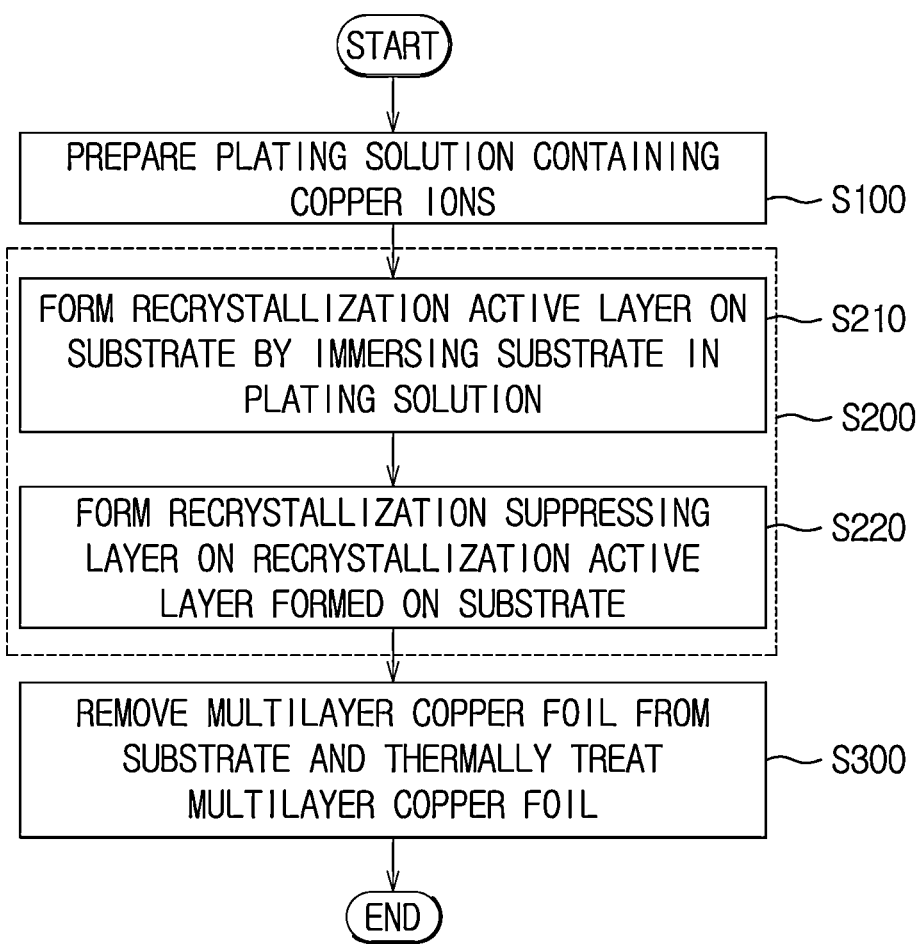
FIG. 2 is a flow chart sequentially illustrating the manufacturing method of the multilayer copper foil according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the present disclosure, the phrase that a certain element "comprises" or "includes" another element means that the certain element may further include one or more other elements but does not preclude the presence or addition of one or more other elements, unless stated to the contrary.

Throughout the present disclosure, when a certain element is "connected" to another element, this includes not only 'directly connected' but also 'connected with another component in the middle.'

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Throughout the present disclosure, the phrase "combination(s) thereof" included in a Markush-type expression denotes one or more mixtures or combinations selected from the group consisting of components stated in the Markush-type expression, that is, denotes that one or more components selected from the group consisting of the components are included.

Throughout the present disclosure, terms such as "first," "second," "A," or "B" are used to distinguish the same terms from each other. The singular forms "a," "an," and "the" include the plural form unless the context clearly dictates otherwise.

In the present disclosure, "B being placed on A" means that B is placed in direct contact with A or placed over A with another layer or structure interposed therebetween and thus should not be interpreted as being limited to B being placed in direct contact with A, unless the description clearly dictates.

In the present disclosure, ppm is calculated based on weight.

In the present disclosure, a singular form is contextually interpreted as including a plural form as well as a singular form unless specially stated otherwise.

The present disclosure has been made to solve the above problems, and an objective of the present disclosure is to provide a multilayer copper foil, a method for manufacturing the same, and an electroplating apparatus to prepare the multilayer copper foil. When manufacturing the copper foil, the copper foil is manufactured to have a lamellar structure, in which a recrystallization suppressing layer and a recrystallization active layer are alternately formed to inhibit the recrystallization of the recrystallization active layer. As a result, the multilayer copper foil may have a small thickness and high strength.

According to the present disclosure, embodiments provide a multilayer copper foil and a method for manufacturing the same capable of manufacturing a multilayer copper foil. By repeatedly supplying high current and low current to alternately flow through a plating solution, the multilayer copper foil is manufactured on a substrate to have a lamellar structure including a recrystallization active layer and a recrystallization suppressing layer, thereby having a small thickness and high strength.

In addition, in the forming of a recrystallization active layer and a recrystallization suppressing layer, a plurality of the plating solution is not required to be prepared since the recrystallization active layer and the recrystallization suppressing layer can be formed with the single plating solution by varying the supplied current. As a result, the thin multilayer copper foils having high strength can be rather easily manufactured.

The electroplating apparatus according to an embodiment of the present disclosure, repeatedly supplies high current and low current to alternately flow through the plating solution, which is automatically set by a user, thereby enabling the manufacturing of the thin multilayer copper foil having high strength.

The present invention can provide and manufacture a thin multilayer copper foil having high strength due to a lamellar structure made up of a recrystallization active layer and a recrystallization suppressing layer. As a result, the multilayer copper foil can be used in secondary battery-related industries where thin copper foils with high strength are required.

Objectives and advantageous effects of the present disclosure are not limited to those mentioned above, and other objectives and advantageous effects not mentioned will be clearly understood from the description below.

Hereinafter, the multilayer copper foil, the method for manufacturing the same, and the electroplating apparatus to prepare the multilayer copper film, according to embodiments of the present disclosure, will be described with reference to the drawings.

The multilayer copper foil 100, according to an embodiment of the present disclosure, includes a recrystallization active layer 110 and a recrystallization suppressing layer 120.

The method for manufacturing the multilayer copper foil, according to an embodiment of the present disclosure, includes a step S100 of preparing of plating solution, a step S200 of plating, and a step S300 of thermal treating.

The electroplating apparatus 200, according to an embodiment of the present disclosure, includes a plating bath 10, a substrate 20, a positive electrode 30, a current supply unit 40, a first relay unit 50, and a second relay unit 60, and a control signal generating unit 70.

For the convenience of description, in describing the multilayer copper foil, the method of manufacturing the same, and the electroplating apparatus therefor according to embodiments of the present disclosure, substantially the same components are described with the same reference numerals, and repeated descriptions are omitted.

First, a plating solution S containing copper ions is prepared (S100).

In the preparing step S100, the plating solution S to be used to manufacture the multilayer copper foil 100 is prepared. The plating solution S may be prepared by mixing at least one of NaCl and HCl, water, sulfuric acid, copper sulfate, an organic additive, and JGB.

In this case, by mixing at least one of NaCl and HCl, water, sulfuric acid, copper sulfate, the organic additive, and the JGB (Janus Green B), the plating solution S may contain sulfuric acid, copper ions ($Cu^{2+}$), the JGB, chlorine ions, and the organic additive.

Sulfuric acid is included in the plating solution S for the improvement in the conductivity of the plating solution S. The plating solution S may include sulfuric acid at a concentration in a range of 0.1 M to 2 M.

When the plating solution S includes sulfuric acid at a concentration of less than 0.1 M, the electrical conductivity of the plating solution S may decrease, so that plating may not be smoothly performed in the plating step S200. When the plating solution S includes sulfuric acid at a concentration of more than 2 M, polarization or passivation of the positive electrode 30 may occur.

The plating solution S includes copper ions, which is reduced in the plating step S200, for the manufacturing of the multilayer copper foil 100. The plating solution S may include copper ions at a concentration in a range of 0.1 M to 1 M by sulfuric copper mixed in the step S100 of the plating solution preparation.

The organic additive included in the plating solution S may include a suppressor and an accelerator.

The suppressor may be at least one selected from the group consisting of polyethylene glycol having a molecular weight in a range of 1000 to 10000, polypropylene glycol, and copolymers thereof. The plating solution S may include the suppressor at a concentration in a range of 0.01 mM to 0.5 mM.

The accelerator may be at least one selected from the group consisting of bis-(3-sulfopropyl)disulfide (SPS) and 3-mercapto-1-propane sulfonic acid (MPSA). The plating solution S may include the accelerator at a concentration in a range of 0.01 mM to 0.2 mM.

The suppressor and the accelerator constituting the organic additive interact with each other to prevent voids from being present inside the multilayer copper foil 100 and to make the dense multilayer copper foil 10 in the plating step S200.

The plating solution S includes the JGB to inhibit the recrystallization of the multilayer copper foil 100 because the JGB slows down a reduction rate in sheet resistance of the multilayer copper foil 100. The plating solution S may include the JGB at a concentration in a range of 0.01 mM to 0.1 mM.

Chlorine ions (Cl⁻) serves as an intermediate conductor in the plating process by a reduction reaction of copper ions in the plating step S200. The plating solution S may include chlorine ions at a concentration in a range of 0.01 mM to 0.1 mM by mixing with at least one of NaCl and HCl.

Next, after immersing a substrate 20 in the plating solution S, electroplating is performed to form a multilayer copper foil 100 including a recrystallization active layer 110 and a recrystallization suppressing layer 120 on a surface of the substrate 20 (S200).

The plating step S200 includes a first plating step S210 and a second plating step S220. The first plating step S210 and the second plating step S220 may be performed multiple times.

In the first plating step S210, the recrystallization active layer 110 may be formed to have a thickness in a range of 0.5 μm to 5 μm in a manner that current, by which a current density value calculatable from a reaction surface area between the plating solution S and the substrate 20 becomes equal to a predetermined first current density value, is supplied to the plating solution S.

In this case, when the recrystallization active layer 110 has a thickness of less than 1 μm, physical properties such as an elongation rate of the multilayer copper foil 100 to be manufactured may deteriorate. When the recrystallization active layer 110 has a thickness of more than 5 μm, grain size may grow, thereby weakening yield strength.

The first current density value for the formation of the recrystallization active layer 110 may be in a range of 1 asd (A/dm$^2$) to 5 asd (A/dm$^2$).

When the first current density value is less than 1 asd or more than 5 asd, grains may grow unevenly or side reactions may occur when the recrystallization active layer 110 is formed, resulting in deterioration in the physical properties of the recrystallization active layer 110.

In the second plating step S220, the recrystallization suppressing layer 120 is formed on the substrate 20, on which the recrystallization active layer 110 is formed.

In the second plating step S220, the recrystallization suppressing layer 120 may be formed to have a thickness in a range of 0.01 μm to 0.5 μm on the substrate 20, on which the recrystallization active layer 110 is formed, in a manner that current, by which a current density value calculatable from a reaction surface area between the plating solution S and the substrate 20 becomes equal to a predetermined second current value, which is lower than the first density value in the first plating S210, is supplied to the plating solution S.

In this case, when the recrystallization suppressing layer 120 has a thickness of less than 0.01 μm, physical properties such as an elongation rate of the manufactured multilayer copper foil 100 may deteriorate. When the recrystallization suppressing layer 120 has a thickness of more than 0.5 μm, grain size may grow, thereby weakening yield strength.

The second current density value for the formation of the recrystallization suppressing layer 120 may be in a range of 0.1 asd to 0.5 asd.

When the second current density value is less than 0.1 asd, copper ions may not be smoothly reduced in the plating step S200. When the second current density value is higher than 0.5 asd, the JGB may insufficiently slow down a reduction rate in sheet resistance such that the grains in the recrystallization suppressing layer 120 may grow. As a result, the recrystallization suppressing layer 120 may insufficiently suppress the recrystallization active layer 110.

The first plating step S210 and the second plating step S220 may be repeatedly performed multiple times. As a result, the multilayer copper layer 100 may be formed by the method of electroplating to have a lamellar structure, in which the recrystallization active layer 110 and the recrystallization suppressing layer 120 are alternately stacked.

The plating solution S can be stirred during electroplating. The stirring may be performed by magnetic bar stirring, paddle stirring, plating solution flow and nozzle spray stirring, stirring by the movement of the object to be plated, or air agitation. However, the stirring method is not limited thereto.

On the other hand, when a potential difference is induced by a voltage applied from an external power between the positive electrode and a negative electrode, an overvoltage exceeding the equilibrium voltage of the plating solution occurs. The larger the overvoltage, the more active reduction reaction occurs at the negative electrode immersed in the plating solution.

Figure 4:
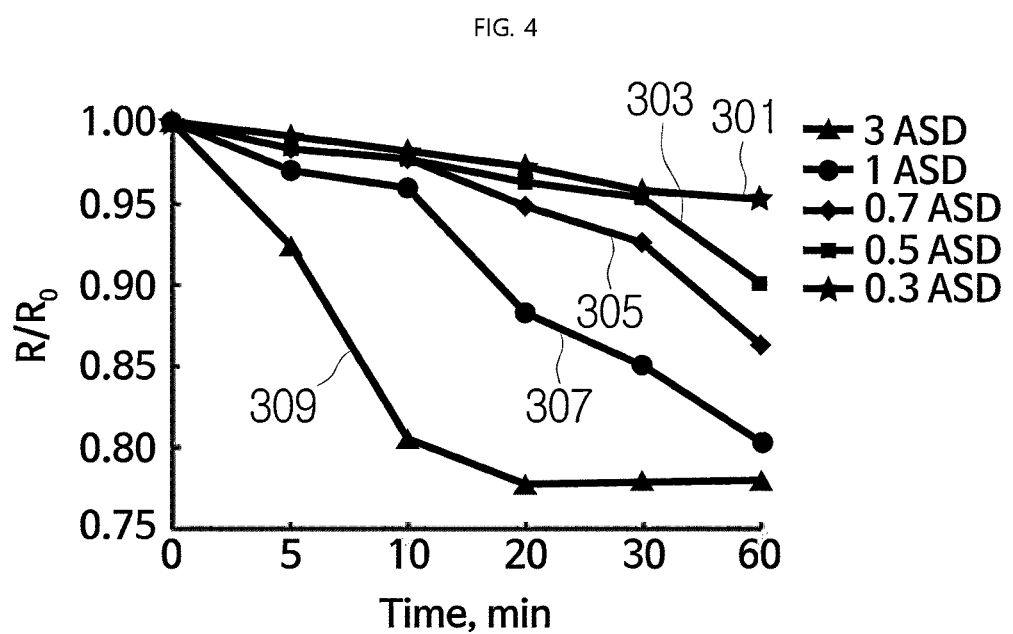
FIG. 4 is a diagram showing results of measuring reduction rates in sheet resistance of copper foil specimens prepared by varying current density values calculatable from a reaction surface area between a substrate and a plating solution.

Referring to FIG. 4, in the plating step S200, it is confirmed that the multilayer copper foils 100 manufactured from the plating solution S under relatively low current density conditions (0.3 asd, 0.5 asd, and 0.7 asd) exhibit a lower reduction rate in sheet resistance than the multilayer copper foils 100 manufactured under relatively high current density conditions (1 asd and 3 asd). This indicates that the recrystallization slowly occurs.

The degree of adsorption of the organic additive to the multilayer copper foil 100 may vary depending on the level of the overvoltage. For example, the concentration of a sulfur (S) element among the impurities included in the plating layer may be 4 ppm at an overvoltage level of −0.25 V, which is relatively high, while the concentration of the S element may be 200 ppm at an overvoltage level of −0.05 V, which is relatively low. That is, there may be 50-fold difference in the concentration of the S element. That is, a reduction in the sheet resistance reduction under the condition of a relatively low current density may be attributed to a mechanism, in which the concentration of the impurities inside the multilayer copper foil 100 increases, the impurities may easily diffuse and be pinned to the grain boundaries, and the growth of grains may be inhibited.

As a result, the degree of absorption of the additive to the surface of the plating, which is a target layer, may vary depending on the degree of the reduction reaction.

Therefore, when external power is independently applied to the plating solution S to have different current density values, the recrystallization active layer 110 and the recrystallization suppressing layer 120 can be alternately formed on the surface of the metal thin film.

As the impurities inhibits the growth of the recrystallization suppressing layer 120, the recrystallization suppressing layer 120 may act as a growth-suppressing layer, which inhibits the grain growth in the recrystallization active layer 110.

On the other hand, the recrystallization active layer 110 may have a thickness in a range of 0.5 μm to 5 μm, and preferably in the range of 1 μm to 2 μm.

In addition, the recrystallization suppressing layer 120 may have a thickness in a range of 0.01 μm to 0.5 μm.

In the method for manufacturing the multilayer copper foil according to another embodiment of the present disclosure, the plating step S200 may further include a resting step S230.

In the resting step S230, while the first plating step S210 and the second plating step S220 are repeatedly performed multiple times such that the recrystallization active layer 110 and the recrystallization suppressing layer 120 are alternately plated, the first current and the second current may not be supplied to the plating solution S between the first plating step S210 and the second plating step S220 or between the second plating step S220 and the first plating step S210.

Lastly, the multilayer copper foil 100 plated on the substrate 20 in the plating step S200 is removed from the substrate 20 and thermally treated (S300).

In the thermal treating step S300, the multilayer copper foil 100 plated on the substrate 20 may be removed from the substrate 20 and thermally treated at a temperature in a range of 65° C. to 95° C. for a time of 85 minutes to 100 minutes.

The plating step S200 may be performed with the electroplating apparatus 200 according to an embodiment of the present disclosure.

Figure 3:
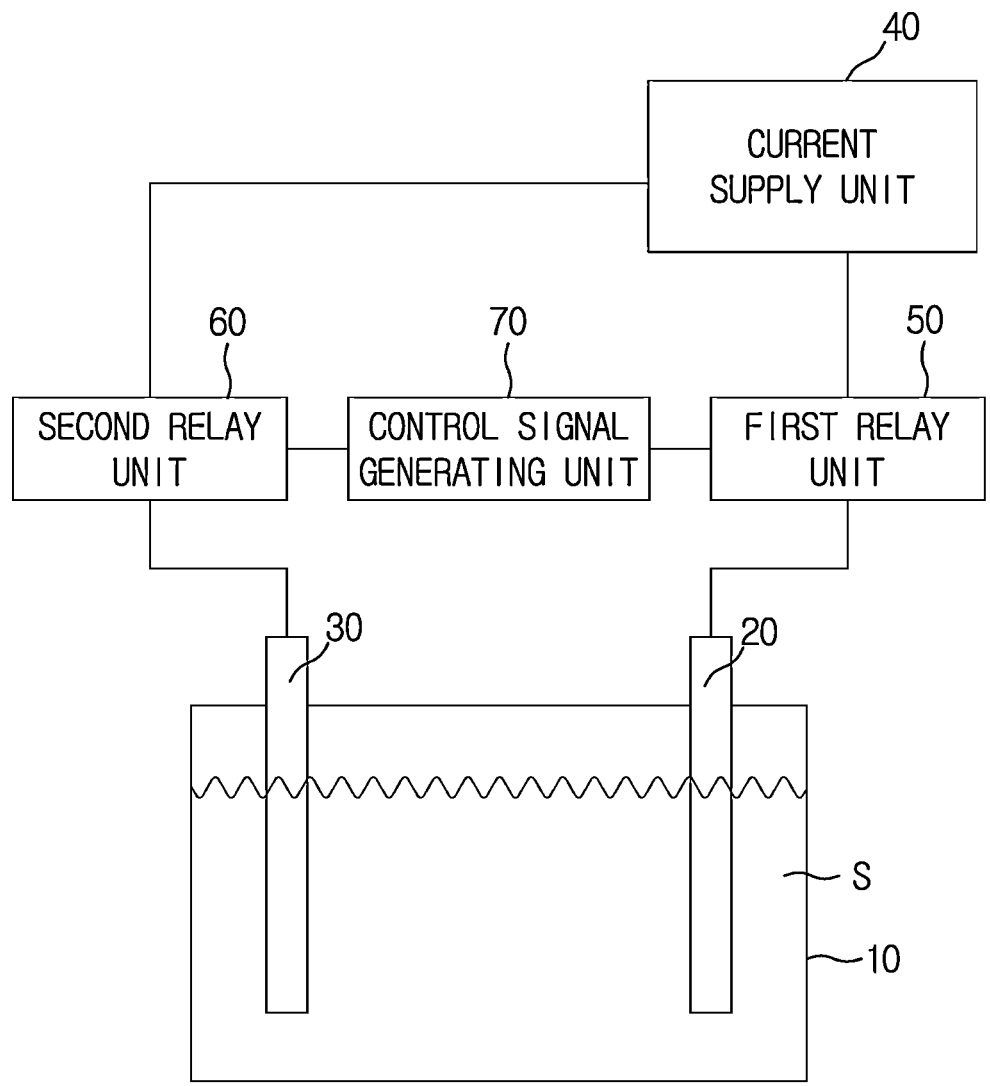
FIG. 3 is a schematic diagram illustrating the electroplating apparatus according to an embodiment of the present disclosure.

Referring to FIG. 3, the electroplating apparatus 200, according to an embodiment of the present disclosure, includes a plating bath 10, a substrate 20, a positive electrode 30, a current supply unit 40, a first relay unit 50, a second relay unit 60, a control signal generating unit 70.

The plating bath 10 may accommodate the plating solution S.

The substrate 20 may be prepared by having a lower portion positioned in a first side of the internal space of the plating bath 10. When copper ions contained in the plating solution S are reduced by current supplied from the current supply unit 40, the multilayer copper foil 100 may be electroplated on the surface of the substrate. The substrate 20 may be any one of a titanium (Ti) electrode and a stainless steel (STS) electrode.

The substrate 20 may act as a negative electrode, which is a counterpart of the positive electrode 30, during electroplating in the plating S200.

When the substrate 20 is any one of the Ti electrode and the STS electrode, there is an advantage that the multilayer copper foil 100 can be easily removed from the substrate 20 in the thermal treating step S300.

The positive electrode 30 may be prepared by having a lower portion positioned in a second side of the internal space of the plating bath 10. The positive electrode 30 may be any one of a phosphor-containing copper electrode, an insoluble iridium oxide ($IrO_2$) film electrode, a platinum oxide ($PtO_2$) film electrode, and a lead (Pb), and preferably the phosphor-containing copper electrode.

The current supply unit 40 is connected to an upper portion of the substrate 20 and an upper portion of the positive electrode 30 to supply a current. However, the current supply unit 40 may supply current such that a first current or a second current is selectively supplied. In this case, the first current has a first current density value calculatable from a reaction surface area between the substrate 20 and the plating solution 10, and the second current has a second current density value, which is relatively lower than the first current density value.

The first current density value calculatable from the reaction surface area between the substrate 20 and the plating solution S by the current supply unit 40 supplying the first current to the plating solution S may be in a range of 1 asd to 5 asd. In addition, the second current density value calculatable from the reaction surface area between the substrate 20 and the plating solution S by the current supply unit 40 supplying the second current to the plating solution S may be in a range of 0.1 asd to 0.5 asd.

The first relay unit 50 electrically connects the substrate 20 with the current supply unit 40 such that any one of the first current and the second current may be supplied to the substrate 20 in response to a presence of a first control signal that is externally input.

When the first control signal is externally input, the first relay unit 50 may supply the first current to the plating solution S. When the first control signal is not externally input, the first relay unit 50 may supply the second current to the plating solution S.

The second relay unit 60 electrically connects the positive electrode 30 with the current supply unit 40 to interrupt the first current and the second current supplied from the current supply unit 40.

The control signal generating unit 70 may input the first control signal and the second control signal to the first relay unit 50 and the second relay unit 60, respectively.

The control signal generating unit 70 may input the first control signal to the first relay unit 50 such that the first current is supplied to the plating solution and thus the recrystallization active layer 110 and the recrystallization suppressing layer 120 are alternately formed on the surface of the substrate 20. Then, the first control signal input to the first relay unit 50 may be disenabled such that the second current is supplied to the plating solution S when a predetermined time has elapsed.

The control signal generating unit 70 may repeatedly input the first control signal to the first relay unit 50 for a predetermined time, and then disenable the first control signal when the predetermined time has elapsed. As a result, the multilayer copper foil 100 may be manufactured to have a lamellar structure, in which a plurality of the recrystallization active layer 110 and a plurality of the recrystallization suppressing layer 120 can be alternately stacked on the surface of the substrate 20.

On the other hand, as the first control signal is input to the first relay unit 50, the first current is supplied to the plating solution S for a first predetermined time, and the second control signal is input to the second relay unit 60 such that a resting period follows for a second predetermined time, in which no current is supplied to the plating solution S when the first predetermined time has elapsed.

The control signal generating unit 70 may input the first control signal to the first relay unit 50 to supply the first current to the plating solution S such that the recrystallization active layer 110 is deposited on a surface of the substrate 20, and then, input the second control signal to the second relay unit 60 when the predetermined time has elapsed such that the resting period follows. Next, the control signal generating unit 70 may disenable the second control signal input to the second relay unit 60 and the first control signal input to the first relay unit 50 such that the recrystallization suppressing layer 120 is deposited on the surface of the recrystallization active layer 110.

The control signal generating unit 70 inputs the first control signal to the first relay unit 50 and inputs the second control signal to the second relay unit 60 when the predetermined time has elapsed such that the resting period follows. As a result, the multilayer copper foil 100 is formed to have the lamellar structure, in which the plurality of the recrystallization active layer 110 and the recrystallization suppressing layer 120 is alternately stacked on the surface of the substrate 20.

Next, the control signal generating unit 70 may disenable the second control signal and the first control signal such that the recrystallization suppressing layer 120 is deposited on the surface of the recrystallization active layer 110, and input the second control signal to the second relay unit 60 when the predetermined time has elapsed such that the resting period follows. Then, the control signal generating unit 70 may input the first control signal to the first relay unit 50 and disenable the second control signal input to the second relay unit 60 such that the recrystallization active layer 110 is deposited on the surface of the recrystallization suppressing layer 120.

The control signal generating unit 70 may repeatedly generate or disenable the first control signal and the second control signal.

Hereinafter, a process, in which electroplating is performed with the electroplating apparatus 200 will be described.

First, a plating solution S is accommodated in a plating bath 10 such that a substrate 20 and a positive electrode 30 are immersed therein.

After inputting a first control signal to a first relay unit 50 for the predetermined time, a second control signal is input to a second relay unit 60 when a predetermined time has elapsed such that a resting period follows. Then, the second control signal and the first control signal are disenabled such that a recrystallization suppressing layer 120 is deposited on the surface of a recrystallization active layer 110, and the second control signal is input to second relay unit 60 when a predetermined time has elapsed such that the resting period follows. Then, the first control signal is input to the first relay unit 50 and the second control signal input to the second relay unit 60 is disenabled such that the recrystallization active layer 110 is deposited on a surface of the recrystallization suppressing layer 120. By repeatedly performing the above process, a multilayer copper foil 100 is formed to have a lamellar structure, in which a plurality of the recrystallization active layer 110 and a plurality of the recrystallization suppressing layer 120 are alternately stacked on the surface of the substrate 20.

Example 1

First, by mixing NaCl, water, sulfuric acid, copper sulfate, an organic additive, and JGB, a plating solution S was prepared to have sulfuric acid at a concentration in a range of 0.1 M to 2 M, copper ions at a concentration in a range of 0.1 M to 1 M, the JGB at a concentration in a range of 0.01 mM to 0.1 mM, and chlorine ions at a concentration in a range of 0.01 mM to 0.1 mM. In this case, as the organic additive, polyethylene glycol (at a molecular weight in a range of 1000 to 10000) and bis-(3-sulfopropyl)disulfide (SPS) were used. The plating solution S included polyethylene glycol at a concentration in a range of 0.01 mM to 0.5 mM and SPS at a concentration in a range of 0.01 mM to 0.2 mM.

After positioning a substrate 20 and a positive electrode 30 in the internal space of the plating solution S, current, by which a current density value calculatable from a reaction surface area between the substrate 20 and the plating solution S became in a range of 1 asd to 5 asd, was supplied. As a result, a recrystallization active layer 110 was formed to have a thickness of 1 μm. In this case, a soluble phosphor-containing copper electrode was used as the positive electrode 30, and stainless steel (STS) was used as the substrate 20.

Current, by which a current density value calculatable from a reaction surface area between the substrate 20 and the plating solution S became in a range of 0.1 asd to 0.5 asd, was supplied. As a result, a recrystallization suppressing layer 120 was formed to have a thickness of 0.1 μm on a surface of the recrystallization active layer 110.

The recrystallization active layer 110 having the thickness of the 1 μm and the recrystallization suppressing layer 120 having the thickness of 0.1 μm were alternately formed repeatedly. As a result, a multilayer copper foil 100 having a structure, in which the recrystallization active layer 110 and the recrystallization suppressing layer 120 is alternately stacked, was plated on the substrate 20 to have the recrystallization active layer 110 in a total thickness of 10 μm.

Lastly, the multilayer copper foil 100 was removed from the substrate 20 and thermally treated.

Example 2

A multilayer copper foil 100 was manufactured in the same manner as in Example 1. However, the multilayer copper foil 100 was manufactured to have a recrystallization active layer 110 in a thickness of 2 μm.

Example 3

A multilayer copper foil 100 was manufactured in the same manner as in Example 1. However, the multilayer copper foil 100 was manufactured to have a recrystallization active layer 110 in a thickness of 3.3 μm, which had the recrystallization active layer 110 in a total thickness of 9.9 μm.

Comparative Example 1

A multilayer copper foil 100 was manufactured in the same manner as in Example 1. However, the multilayer copper foil 100 was manufactured to have a recrystallization active layer 110 in a thickness of 5 μm.

Comparative Example 2

A multilayer copper foil 100 was manufactured in the same manner as in Example 1. However, the multilayer copper foil 100 was manufactured to have a monolayer of a recrystallization active layer 110 in a thickness of 10 μm, without forming a recrystallization suppressing layer 120.

Experimental Example

For the measurement of yield strength and tensile strength of each of the multilayer copper foils 100 manufactured in Examples 1 to 3 and Comparative Examples 1 to 2, a uniaxial tensile test was performed to measure the yield strength and tensile strength.

In addition, grain sizes in the recrystallization active layer 110 of the multilayer copper foils 100 manufactured in Examples 1 to 3 and Comparative Examples 1 to 2 were measured through analysis performed with EBSD. In this case, for the smooth calculation of the grain sizes, the twin boundary was excluded from the consideration.

The yield strength, tensile strength, and grain size of each recrystallized active layer 110 being measured are summarized in Table 1.

TABLE 1

| | Average grain size (μm) | Yield Strength (kgf/mm²) | Tensile Strength (kgf/mm²) |
|---|---|---|---|
| Example 1 | 1.63 | 42.17 | 49.97 |
| Example 2 | 3.04 | 29.87 | 33.70 |
| Example 3 | 3.78 | 27.76 | 31.52 |
| Comparative Example 1 | 5.12 | 27.85 | 31.23 |
| Comparative Example 2 | 5.58 | 28.59 | 32.25 |

Referring to Table 1, it is confirmed that the tensile strength and yield strength of the multilayer copper foil 100 manufactured in Example 3 and each of the multilayer copper foils 100 manufactured in Comparative Examples 1 and 2 can be at a similar level. However, the tensile strength of each of the multilayer copper foils 100 manufactured in Examples 1 and 2 appears to be higher than that of each of the multilayer copper foils 100 prepared in Comparative Examples 1 and 2.

The result confirms that, since the recrystallization suppressing layer 110 inhibits the regrowth of the grains in the recrystallization, the grain size can decrease, thereby enhancing the tensile strength of the multilayer copper foil 100.

Figure 6:
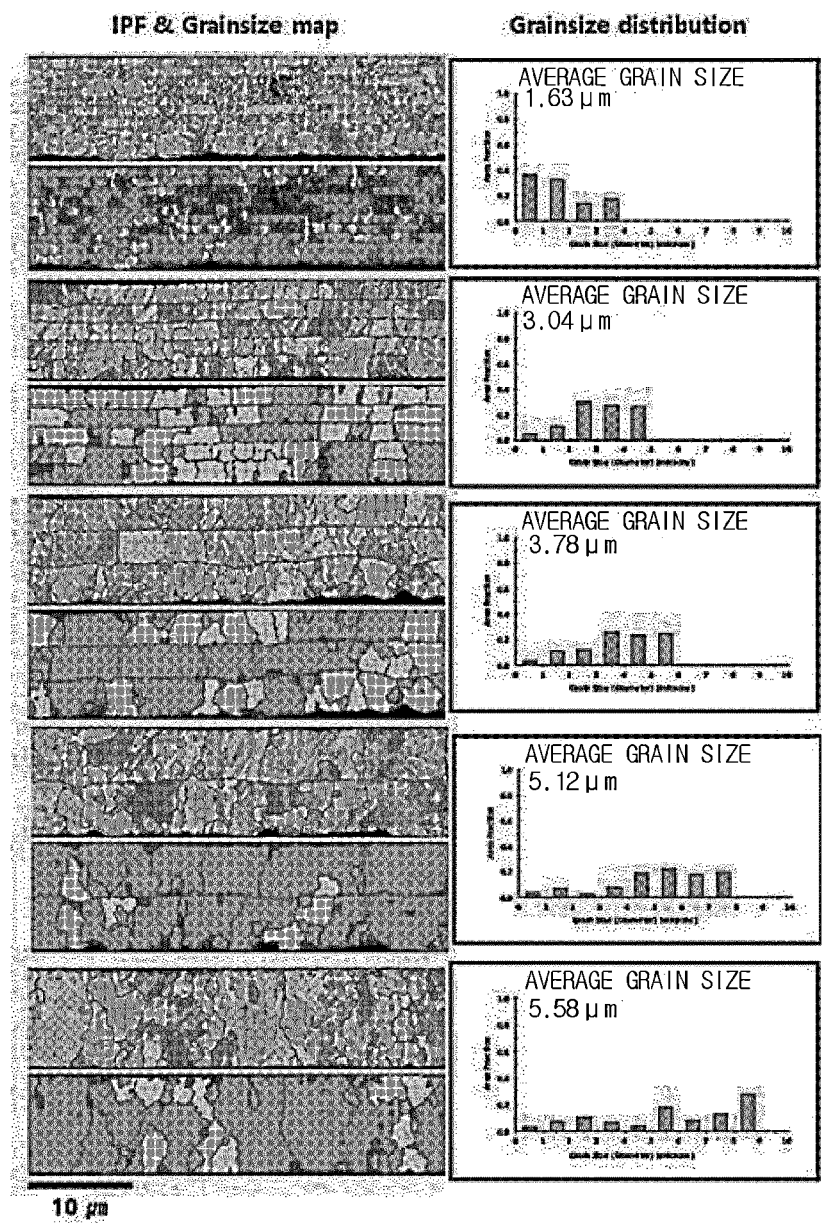
FIG. 6 is a diagram showing EBSD analysis results for each of cross sections of multilayer copper foils prepared in Examples 1 to 3 and Comparative Examples 1 to 2.

In addition, referring to Table 1 and FIG. 6, it is confirmed that the average grain size of each of the multilayer coppers foil 100 manufactured in Examples 1 to 3 can be smaller than that of each of the multilayer copper foils 100 manufactured in Comparative Examples 1 and 2. The result confirms that the tensile strength can be enhanced as the average grain size decreases.

Figure 7:
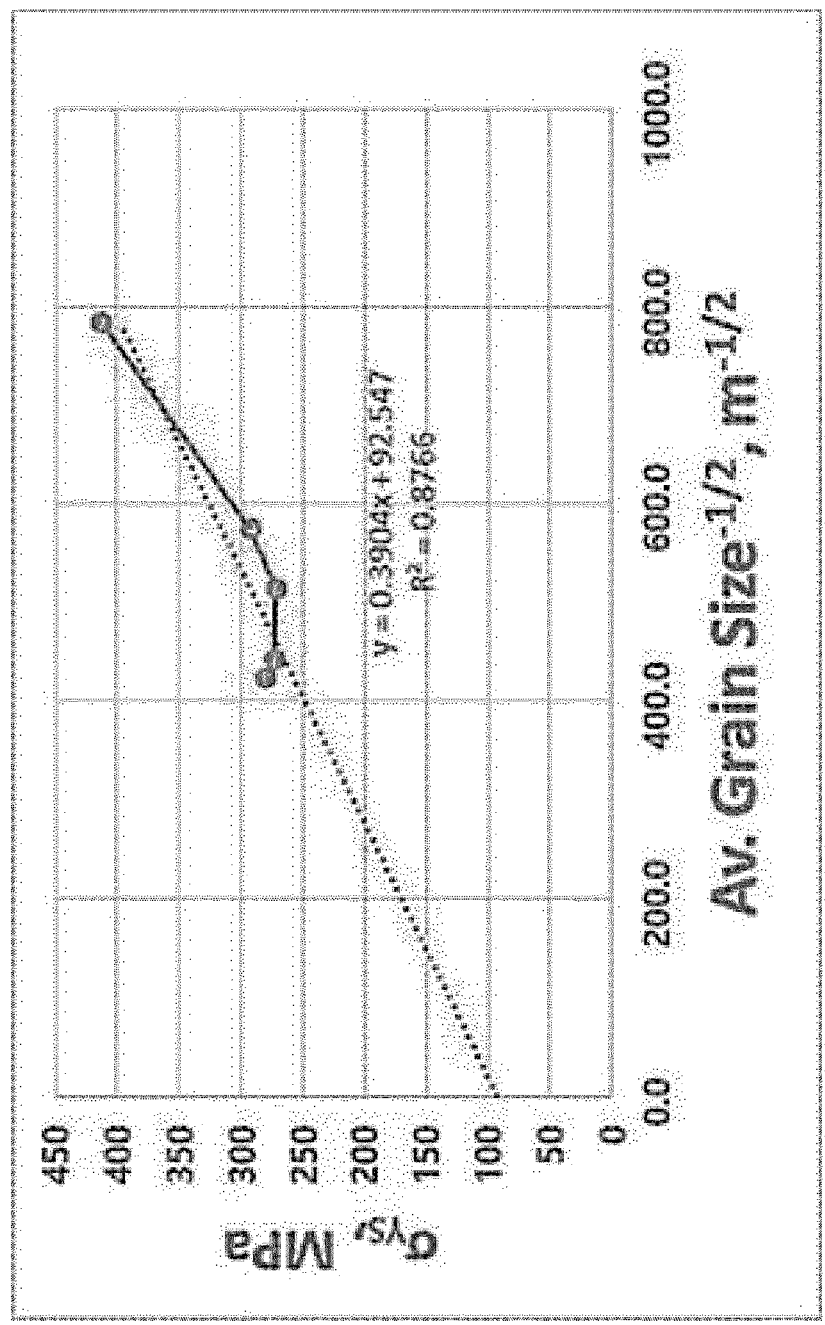
FIG. 7 is a graph showing Hall-Petch relationship of a multilayer copper foil according to the present disclosure.

On the other hand, FIG. 7 is a graph showing Hall-Petch relationship of the multilayer copper foil 100 by fitting measurement results in Table 1 using Hall-Petch equation.

Referring to FIG. 7, it is confirmed that the yield strength and tensile strength may increase as the thickness of the recrystallization active layer 110 decreases. In addition, when the recrystallization active layer 110 has a thickness of 3 μm or more, the strength value may slowly change.

In addition, when the recrystallization active layer 110 has a thickness of 3 μm or less, it is confirmed that the grain size may linearly increase. However, when the recrystallization active layer 110 has a thickness of more than 3 μm, it is confirmed that the grain size may slowly change.

Fitted variable values in yield strength of the recrystallization active layer 110 having a thickness of 3 μm or less, which relatively changes greatly in strength, were obtained using the following Hall-Petch equation. Referring to FIG. 7, the Hall-Petch relationship may be confirmed by the average grain size and the yield strength.

$$\sigma_{YS} = \sigma_0 + \frac{K_Y}{\sqrt{d}} \quad \text{(Equation 1)}$$

$$\sigma_{YS} = 92.5 MPa + \frac{0.390 MPa \times m^{1/2}}{\sqrt{d}} \quad \text{(Equation 2)}$$

In this case, Equation 1 is the Hall-Petch equation, and Equation 2 is a Hall-Petch approximation equation of the multilayer copper foil 100 calculated based on Table 1 and FIG. 7. In this case, $\sigma_{YS}$ is a yield strength, $K_Y$ is a fitting constant (inherent constant of a material), d is an average grain size, and $\sigma_0$ is a yield strength when the average grain size has an infinite value.

When examining the approximation equation, it is confirmed that the $\sigma_0$ may be rather high as above, while copper in the actual bulk state exhibits the $\sigma_0$ of 25 MPa and the $K_Y$ of 0.12 MPa·m$^{1/2}$.

This indicates that, while typical bulk copper has a grain size of several tens of μm, the multilayer copper foil 100 has the grain size of about 1/10 smaller than that of the bulk copper. That is, decreased average grain size and enhanced dispersion may affect the increase in yield strength.

Reference Example

First, by mixing NaCl, water, sulfuric acid, copper sulfate, an organic additive, and JGB, a plating solution S was prepared to have sulfuric acid at a concentration in a range of 0.1 M to 2 M, copper ions at a concentration in a range of 0.1 M to 1M, the JGB at a concentration in a range of 0.01 mM to 0.1 mM, and chlorine ions at a concentration in a range of 0.01 mM to 0.1 mM. In this case, as the organic additive, polyethylene glycol (at a molecular weight in a range of 1000 to 10000) and bis-(3-sulfopropyl)disulfide (SPS) were used. The plating solution S included polyethylene glycol at a concentration in a range of 0.01 mM to 0.5 mM and SPS at a concentration in a range of 0.01 mM to 0.2 mM.

After positioning a substrate 20 and a positive electrode 30 in the internal space of the plating solution S, a copper foil made of a monolayer was manufactured on the substrate 20 by allowing current density values calculatable from a reaction surface area between the substrate 20 and the plating solution S to be 3 asd, 1 asd, 0.7 asd, 0.5 asd, and 0.3 asd. The plating layer was removed from the substrate 20 and then, was thermally treated at a temperature of 80° C. for 90 minutes such that five copper foil specimens were prepared. In this case, a soluble phosphor-containing copper electrode was used as the positive electrode 30, and stainless steel (STS) was used as the substrate 20.

Each of the reduction rates in sheet resistance of the five copper foil specimens was measured using a four-point probe by having the current density values at 3 asd, 1 asd, 0.7 asd, 0.5 asd, and 0.3 asd, and the results thereof are shown in FIG. 4.

Figure 5:
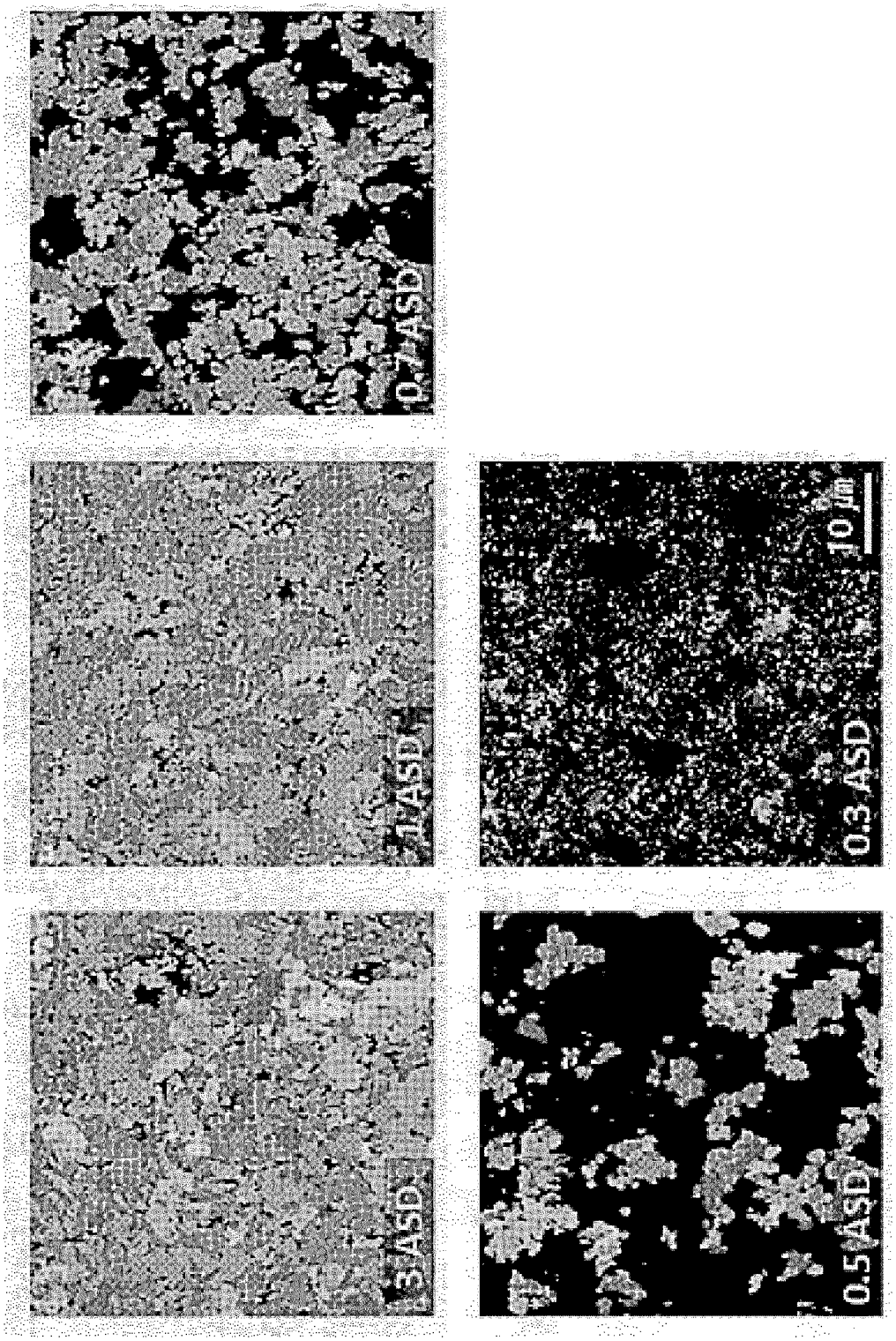
FIG. 5 is a diagram showing EBSD analysis results for each of planes of copper foil specimens prepared by varying current density values calculatable from a reaction surface area between a substrate and a plating solution.

In addition, each of the thermally treated samples was subjected to electron backscattered diffraction (EBSD) microstructural analysis using a field emission scanning electron microscopy (FESEM) device equipped with a Hikari XP EBSD camera, and the analysis results are shown in FIG. 5.

FIG. 4 is a diagram showing results of measuring reduction rates in sheet resistance of the copper foil specimens prepared by varying current density values calculatable from reaction surface areas between the substrate 20 and the plating solution S. More particularly, FIG. 4 is the diagram showing the reduction rates in sheet resistance 301, 303, 305, 307, and 309 of the multilayer copper foils 100 manufactured when the current density values calculatable from the reaction surface areas between the substrate 20 and the plating solution S were 0.3 asd, 0.5 asd, 0.7 asd, 1 asd, and 3 asd, respectively.

Referring to FIG. 4, it is confirmed that even when the same plating solution S is used, the reduction rate in sheet resistance can be changed depending on the different current density values. In the plating step S200, it is confirmed that the multilayer copper foils 100 manufactured from the plating solution S under the conditions (0.3 asd, 0.5 asd, and 0.7 asd), in which the current density values calculatable from the reaction surface areas between the substrate 20 and the plating solution S are relatively low, exhibit a lower reduction rate in sheet resistance than the multilayer copper foils 100 manufactured under the conditions (1 asd and 3 asd), in which the current density values calculatable from the reaction surface areas between the substrate 20 and the plating solution S are relatively high. This indicates that the recrystallization slowly occurs.

On the other hand, when a potential difference is induced by a voltage applied from an external power between the positive electrode 30 and the substrate 20, an overvoltage exceeding the equilibrium voltage of the plating solution S occurs. The larger the overvoltage, the more active the reduction reaction occurs at the substrate 20 immersed in the plating solution S.

The degree of absorption of the organic additive to the surface of the plating, which is manufactured by a reduction reaction, may vary depending on the level of the overvoltage. For example, the concentration of an S element included among the impurities included in the plating layer may be 4 ppm at an overvoltage level of −0.25 V, which is relatively high, while the concentration of the S element may be 200 ppm at an overvoltage level of −0.05 V, which is relatively low. That is, there may be 50-fold difference in the concentration of the S element. That is, a reduction in the sheet resistance reduction under the condition of a relatively low current density may be attributed to a mechanism, in which the concentration of the impurities inside the multilayer copper foil 100, which is a counterpart of the surface of the plating, increases, the impurities may easily diffuse and be pinned to the grain boundaries, and the growth of grains may be inhibited.

In addition, referring to FIG. 5, it is confirmed that the grains in the plating layer can sufficiently grow under the relatively high current density conditions (1 asd and 3 asd), while the grains in the plating layer can partially grow under the relatively low current density conditions (0.3 asd, 0.5 asd, and 0.7 asd), thereby having a structure coexisting with fine grains having an initial nano-size. As a result, by appropriately regulating the current density, it is expected that the concentration of the impurities can be controlled and the plating laying above can act as a growth suppressing layer inhibiting the grain growth.

Those who are ordinarily skilled in the art will appreciate that various alternatives, modifications, and equivalents are possible, without changing the spirit or essential features of the present disclosure. Therefore, preferred embodiments of the present disclosure have been described for illustrative purposes, and should not be construed as being restrictive. The scope of the present disclosure is defined by the accompanying claims rather than the description which is presented above. Moreover, the present disclosure is intended to cover not only the exemplary embodiments, but also various alternatives, modifications, equivalents, and other embodiments that may be included within the spirit and scope of the present disclosure as defined by the appended claims.

The invention claimed is:

1. An electroplating apparatus comprising:
   a plating bath filled with a plating solution comprising copper ions;
   a substrate having a lower portion positioned in a first side of an internal space of the plating bath;
   a positive electrode having a lower portion positioned in a second side of the internal space of the plating bath;
   a current supply unit connected to an upper portion of the substrate and an upper portion of the positive electrode to supply current such that a current flows through the plating solution when an electric power is applied, wherein the current is supplied such that a first current or a second current is selectively supplied, the first current having a first current density value calculatable from a first reaction surface area between the substrate and the plating solution, the second current having a second current density value calculatable from a second reaction surface area between the substrate and the plating solution and being lower than the first current density value;
   a first relay unit electrically connecting the substrate with the current supply unit such that one of the first current and the second current is supplied to the substrate according to a first control signal that is externally input; and
   a control signal generating unit configured to input the first control signal to the first relay unit,
   wherein the control signal generating unit inputs the first control signal to the first relay unit such that the first current is supplied to the plating solution and disenables the first control signal input to the first relay unit such that the second current is supplied to the plating solution when a predetermined time has elapsed, thereby enabling the recrystallization active layer and the recrystallization suppressing layer to be alternately stacked on the surface of the substrate.

2. The electroplating apparatus of claim 1, further comprising a second relay unit electrically connecting the positive electrode with the current supply unit to interrupt the first current and the second current supplied from the current supply unit according to a second control signal input from the control signal generating unit.

3. The electroplating apparatus of claim 2, wherein the control signal generating unit inputs the first control signal to the first relay unit such that the first current is supplied to the plating solution and thus the recrystallization active layer is formed on the surface of the substrate, inputs the second control signal to the second relay unit when a predetermined time has elapsed such that a resting period follows, and disenables the second control signal input to the second relay unit and disenables the first control signal input to the first relay unit such that the second current is supplied to the plating solution and thus the recrystallization suppressing layer is formed on a surface of the recrystallization active layer.

4. The electroplating apparatus of claim 1, wherein the first current density value is in a range of 1 asd to 5 asd, and the second current density value is in a range of 0.1 asd to 0.5 asd.

\* \* \* \* \*